US006329945B1

(12) United States Patent
Hynes

(10) Patent No.: US 6,329,945 B1
(45) Date of Patent: Dec. 11, 2001

(54) SYSTEM FOR IMPROVED GPS ACCURACY USING A SKY MAP

(75) Inventor: Dana Hynes, Southeast Calgary (CA)

(73) Assignee: NovAtel, Inc., Alberta (CA)

( * ) Notice: Subject to any disclaimer, the term of this patent is extended or adjusted under 35 U.S.C. 154(b) by 0 days.

(21) Appl. No.: 09/553,729

(22) Filed: Apr. 20, 2000

(51) Int. Cl.⁷ ...................................................... G01S 5/02
(52) U.S. Cl. .............................. 342/357.06; 342/357.01; 342/357.11; 342/406; 342/455; 701/213
(58) Field of Search .................... 342/357.06, 357.01, 342/357.11, 357.12, 406, 455; 701/213, 215

(56) References Cited

U.S. PATENT DOCUMENTS

| 4,546,355 | * | 10/1985 | Boles | .................................... | 342/179 |
| 5,343,212 | * | 8/1994 | Rose et al. | ............................. | 342/424 |
| 6,055,478 | * | 4/2000 | Heron | .................................... | 701/213 |

* cited by examiner

*Primary Examiner*—William A. Cuchlinski, Jr.
*Assistant Examiner*—Olga Hernandez
(74) *Attorney, Agent, or Firm*—Cesari & McKenna, LLP

(57) ABSTRACT

According to the invention, a system utilizing satellites of known locations produces a sky map containing quality values relating locations in the sky to the quality of signals received from those locations. The sky map reflects known variability in signals received from satellites at selected areas of azimuth and elevation based upon historical data collected at a fixed or known GPS receiver location. The system uses the quality values to assign a weight to each set of measurements for that area in the sky. The invention thus improves the accuracy of GPS positioning by providing a good indicator of the quality of the measurements.

8 Claims, 4 Drawing Sheets

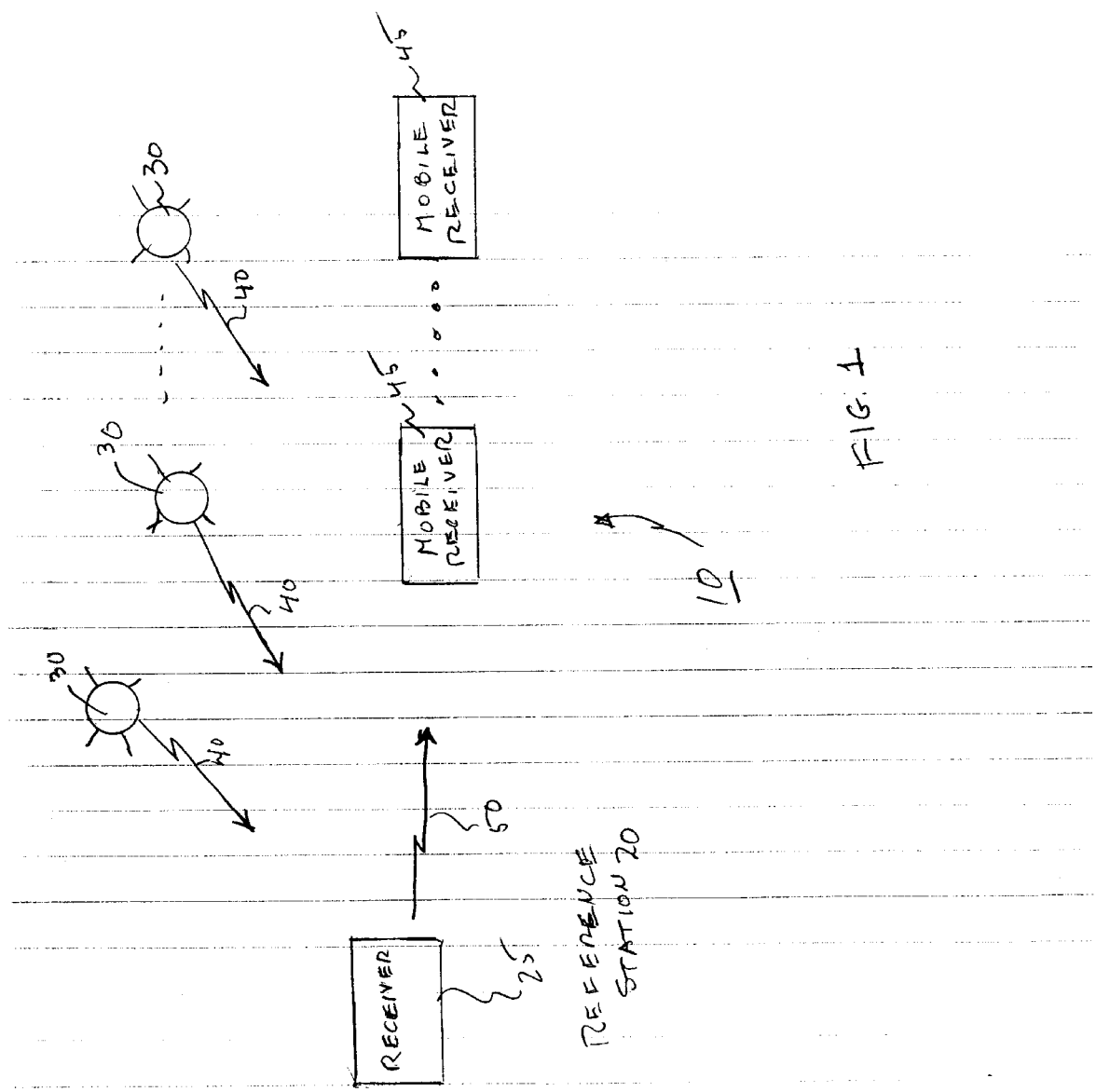

SYSTEM FOR IMPROVED GPS ACCURACY USING A SKY MAP

FIELD OF THE INVENTION

The invention relates to a satellite navigation receiver and, more specifically, to a receiver that weights range information from satellites according to their directions from the receiver.

BACKGROUND OF THE INVENTION

In a satellite navigation system, multiple satellites, of known positions encode their transmissions in a manner that permits a receiver to calculate its "pseudo-ranges" to the transmitting satellites. The receiver then uses the calculated pseudo-ranges from several satellites to resolve its own position. Examples of such systems are the Global Positioning System (GPS) and Global Navigation Satellite System (GLONASS). The range measurements, and the resulting calculation of a receiver's position, vary in accuracy, due to the adverse effects of multipath and other interference on the received signals.

The accuracy of range measurements from the satellites generally decreases as the satellites approach the horizon. This is primarily due in part to the increased magnitude of reflected or refracted signals that result in multipath interference. Some current systems thus provide for rejection of signals from all satellites having an elevation below an operator-controlled cutoff. However, measurements do not consistently degrade with decreasing satellite elevation. A measurement from a satellite having five degrees elevation may be more precise, or exhibit less variability, than a measurement from a satellite having thirty degrees elevation. The accuracy of the measurements also varies according to azimuth, because of differences in the terrain features that cause multipath interference and also because of the effects of interfering signals from various other sources.

SUMMARY OF THE INVENTION

The invention makes use of the fact that in many situations the relative reliability of satellite signals received from various directions substantially repeats appreciably over a substantial period of time, e.g. 24 hours. Accordingly data collected over a period of that length can be used to assign reliability values to the respective directions. Satellite signals are then weighted in accordance with the directions from which they are received.

For example a differential GPS ground station, which is at a fixed location, will usually be subject to much the same distortion characteristics from day to day. Another example is a ship at sea, which primarily experiences distortion from reflections from the surface of the ship itself. The reflection characteristics thus change appreciably only from substantial changes in the surface of the vessel. An airplane more than 300 meters above ground does not experience multipath distortions from the earth's surface. Accordingly, multipath is due entirely to reflections from the surface of the airplane. It therefore varies only in response to movement of the control surfaces, e.g. ailerons or if structural changes are made to the surface of the airplane. Even closer to the ground the multipath interference is due primarily to reflections from the surface of the aircraft.

According to the invention, the receiver divides the sky into direction bins, each of which comprises a small range of azimuth and elevation angles. For example, the size of each bin may be five degrees in both azimuth and elevation, in which case there will be 1296, bins (72-azimuth times 18 elevation). The receiver generates a sky map reflecting the reliability of the measurements made as satellites pass through the respective bins. It uses this data to assign a reliability factor to each bin. This factor is used to assign weights to the pseudo-ranges measured for satellites in those bins and thereby improve the accuracy of the determination of receiver position.

In the simplest implementation of the invention, the receiver ignores all measurements of satellites passing through bins in which the reliability factor is less than a predetermined level. Alternatively, measurements obtained from all bins may be used, with the relative weights depending on the respective reliability factors.

The data used to assign the reliability factors may be the variations in signal-noise ratio from the satellites passing through each bin. In the absence of distortion, the signal-noise ratio will vary by a relatively small amount as a satellite passes through a bin and the variation will generally be monotonic. On the other hand, with multi-path reflections or refractions, for example, the phase of the multi-path signals relative to that of the direct signal from the satellite will vary with satellite position. Thus, the signal-noise ratio of the resultant signal will also vary, usually periodically. The standard deviation of the signal-noise ratios of the signals received from a satellite passing through a bin will thus vary in accordance with the strength of the multi-path signal and will therefore be a measure of the reliability of the signals received from that bin.

In the preferred embodiment of the invention, the receiver uses code-minus-carrier measurements to assign reliability factors for the respective directional bins. Specifically, as a satellite passes through a bin, the receiver makes successive measurements of the satellite's pseudo-range, based on the timing of the pseudo-random code received form the satellite. At the same time, it measures the amount by which the carrier phase changes for the corresponding pseudo-range measurements. For each pseudo-range measurement it then subtracts to the carrier range from the code range, thereby generating a code-minus-carrier (CMC) value. These values are collected during the interval that the satellite passes through the bin and the standard deviation of these values is accumulated for each satellite passing through the bin for a predetermined period, for example, 24 hours. A large standard deviation signifies that the range measurements for the bin are less reliable than those corresponding to a small CMC standard deviation. At the end of the predetermined period, all of the standard deviations accumulated for each bin are averaged to obtain a reliability factor for that bin. Preferably further improvements are achieved by correcting for ionospheric divergence, using different carrier frequencies from each satellite in accordance with a well-known procedure.

More specifically, multi-path signals adversely affect pseudo-range measurements, which depend on the timing of the received pseudo-random code. That is, they shift the peak of the correlation curve and/or distort the curve, thereby causing an error in pseudo-range measurement. The magnitude of the error depends on such factors as the timing of the multi-path signal relative to the direct signal from the satellite and also on the strength of the multi-path signal. On the other hand, because the strength of the multi-path signal is substantially less than that of the direct signal, it does not have a material effect on the overall phase of the resultant carrier. Accordingly, the accumulated phase change from measurement to measurement in the absence of multi-path will be close to that encountered in the presence of multipath. Variations in the code-minus-carrier values are therefore a measure of the reliability of the pseudo-range measurements.

The invention is applicable primarily to fixed stations, i.e., stations in which the surrounding objects that are a source of multi-path distortion do not move appreciably relative to the receivers. These stations include base stations for differential-GPS systems, receivers used in control survey arrangements, ships at sea and airplanes in flight. Of course there may be changes in the surrounding environment from time to time and a feature of the invention is that major changes can be detected and the sky map altered accordingly. Moreover, if an intruding source of reflections, such as an automobile, is the cause of multi-path degradation of pseudo-range measurements, the cause can be identified to the operator and then removed.

For receivers located on the surface of the earth, the surface of the sky map as described above, is a hemisphere. An aircraft in flight however, is subject to rotation about three axes and thus might have a full range of orientations relative to the satellites. The corresponding sky map is therefore a sphere, with the directions of the bins referenced to an aircraft parameter such as its heading. The orientation of the aircraft relative to the earth's surface, as measured by conventional instrumentation, is combined with the directions to the satellites so as to reference the satellite directions to the aircraft heading and thereby record the measurements in the appropriate bins of the sky map.

Similarly, the hemispherical or spherical sky map used for a ship at sea is referenced to the heading of the ship and a similar translation of the directions to the satellites is made in order to associate the respective measurements to the appropriate bins of the sky map.

In one aspect of the invention, quality measurements for each bin are used to assign weights to range data derived from satellites therein, thus providing improved solutions to position calculations.

In another aspect of the invention, a reference station stops tracking a satellite when it is about to pass through a previously identified low-quality bin. This frees up channels in the receiver for tracking other satellites.

BRIEF DESCRIPTION OF THE DRAWINGS

The invention description below refers to the accompanying drawings, of which:

FIG. 1 depicts a satellite navigation system;

DETAILED DESCRIPTION OF AN ILLUSTRATIVE EMBODIMENT

Figure 2A:
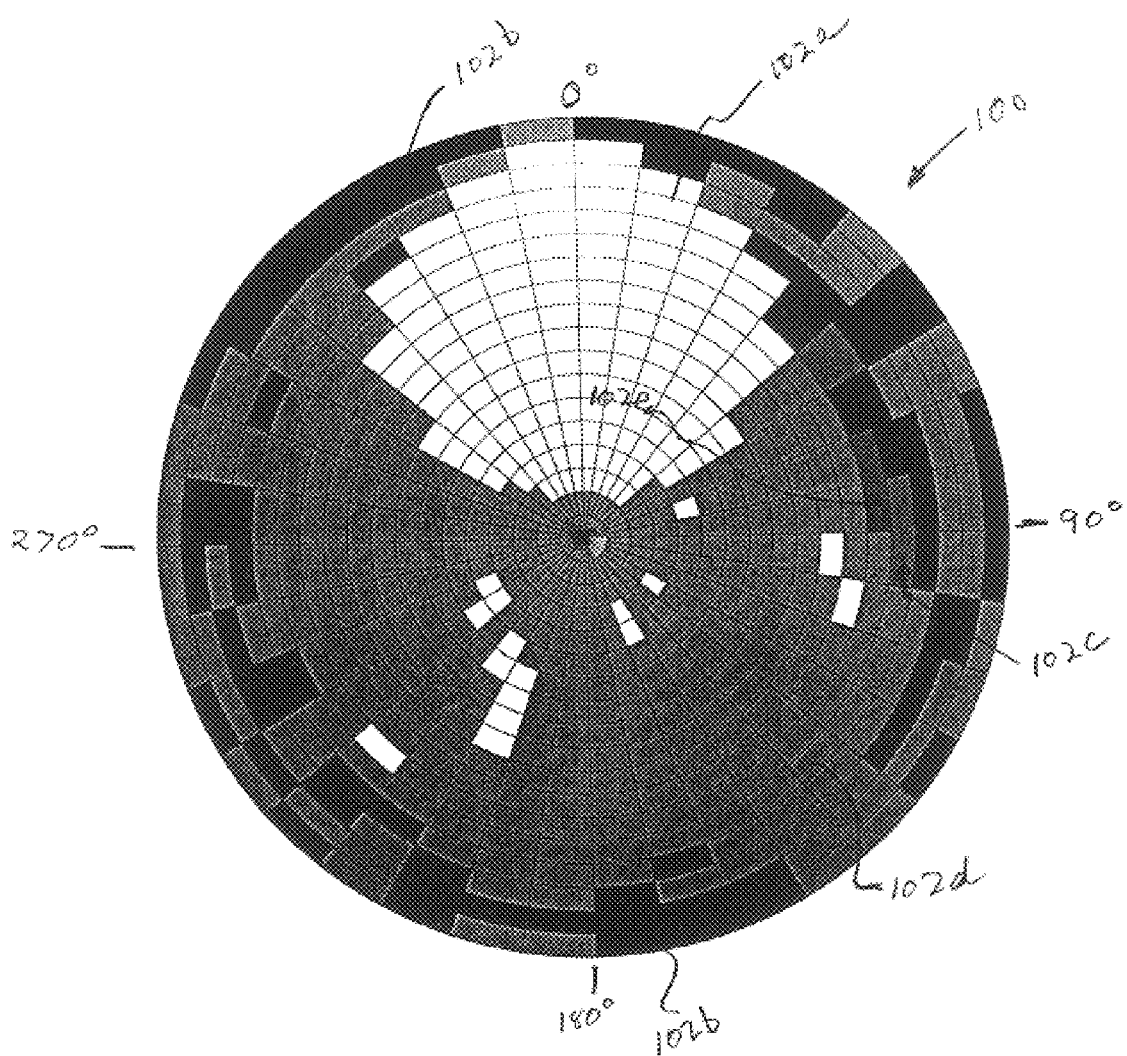
FIG. 2a is a sky map generated in accordance with the invention.

FIG. 1 shows a differential satellite navigation system 10. The system includes a differential arrangement, employing a reference station 20, which includes a receiver 25 at a known location. The reference station 20 determines the pseudo-range to each satellite 30 in view, based upon the signals 40 received from each satellite. The station 20 calculates the error in each satellite pseudo-range measurement, i.e., the difference between the measured range and the actual range, and calculates a correction for that satellite. The correction data is transmitted to mobile receivers 45 over a convenient communication link 50. Each of the receivers 45, in turn, uses the correction data to correct its own pseudo-range measurements from the various satellites 30. A differential system is described in more detail in "Differential GPS," Parkinson, B. W., and Enge, P. K., 1995, published in "Global Positioning System: Theory and Applications," 1995, Vol. II, Chap. 1, pages 3–50, the teachings of which are incorporated by reference.

Figure 2B:
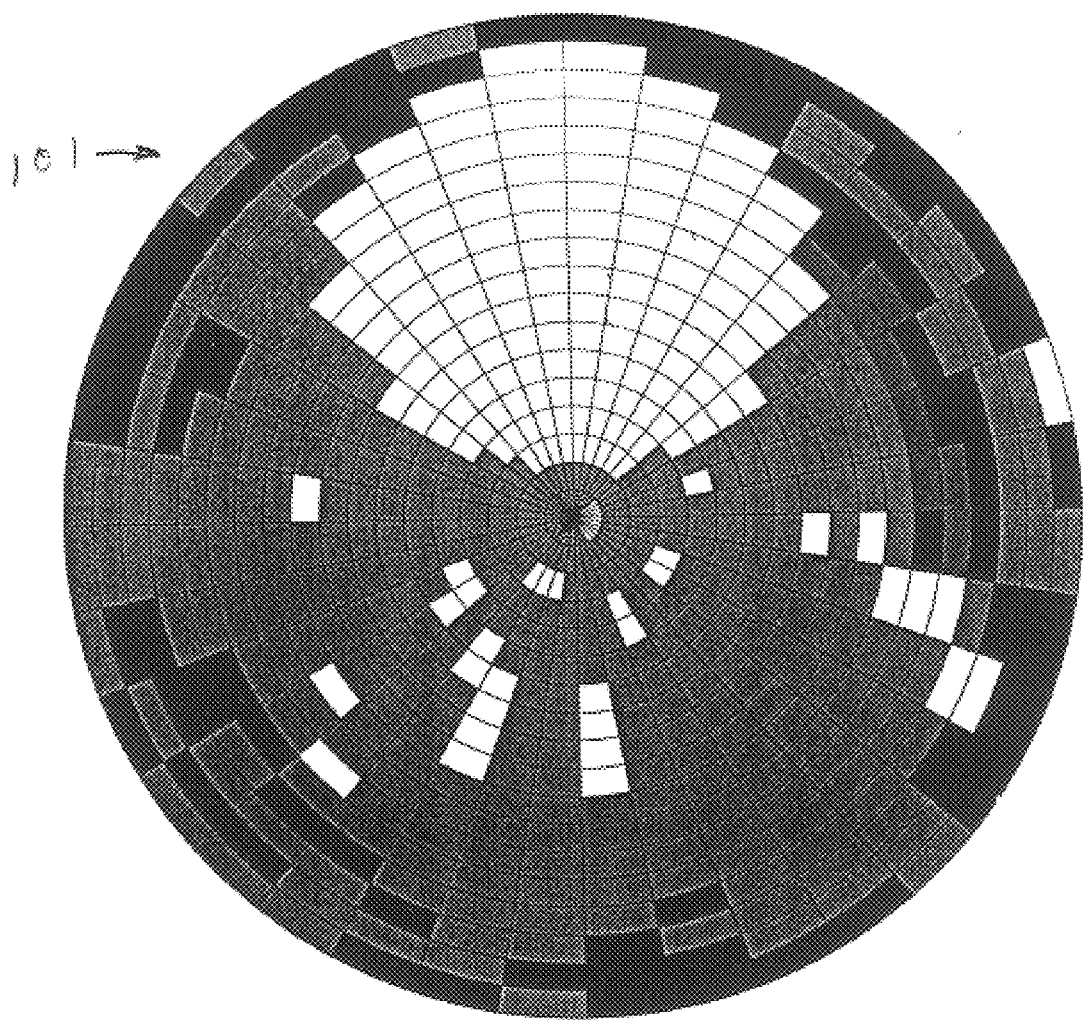
FIG. 2b is a sky map generated 24 hours later.

FIGS. 2A and 2B are sky maps 100 and 101, generated according to the invention, using a receiver with a choke ring antenna. The maps are polar plots centered at the position of the GPS receiver antenna. Thus the center of each map corresponds to the vertical (overhead) direction from the antenna. The horizon is at the periphery of the map. The azimuthal orientation is as indicated in the drawing. Each sky map segments the entire viewable sky into ten-by-five degree bins 102a–102e. Each bin 102 thus represents a region of the sky bounded by two conceptual lines separated by ten degrees azimuth, and by two conceptual lines separated by five degrees elevation. The system associates with each bin 102 a value representing the quality of signals received from GPS satellites 30 within that bin 102. The system stores the sky map 100 in a memory such that it is accessible by bin (i.e., direction in the sky). It will be appreciated that other mappings or projections may be used for the sky map bins 102.

More specifically, with one exception, the "color" (shading) of each sky map bin 102 represents the standard deviation of code-minus-carrier measurements in units of millimeters, as indicated below.

Bins 102b–0–400

Bins 102c–400–600

Bins 102d–600–800

Bins 102e–800–1000

The white bins 102(a) are ones in which no data was collected, i.e. no satellites passed through these bins during the period of measurement. Most of these bins are in northerly directions from the site where the measurements were made, reflecting the fact that GPS satellites do not pass over the North Pole.

The sky maps in 100 and 101 were generated at the same receiver location. However the map 101 represents conditions twenty-four hours after those represented by map 100. It will be apparent that there was relatively little change in conditions over twentyfour hours. Thus, reliability values averaged over twenty-four hours can be used to estimate the reliabilities of measurements from the respective bins.

Figure 3:
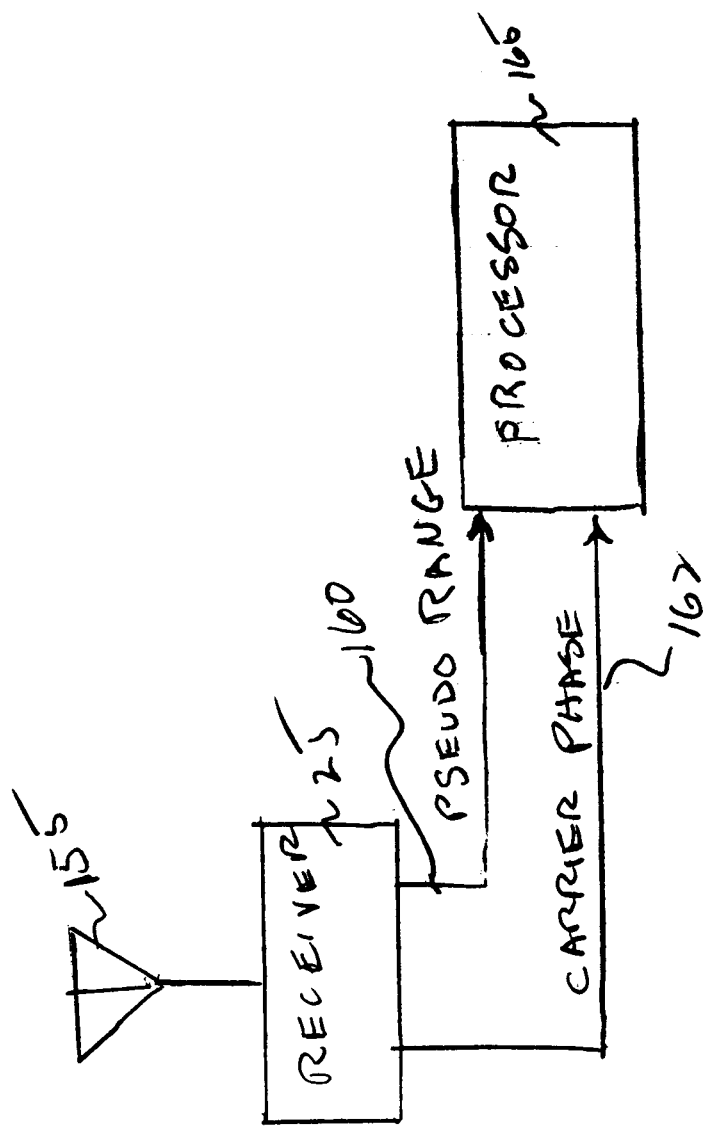
FIG. 3 is a block diagram of a reference station incorporating the invention.

FIG. 3 is a block diagram of a reference station 20 using the sky maps 101 and/or 102. The reference station 20 includes an antenna 155 that receives signals from satellites 30. The receiver 25 in the reference station 20 converts the received signal into distance measurements according to known GPS techniques, i.e.; code-based range measurements referred to as a "pseudo-ranges." It also provides carrier-phase-based range change measurements based on known techniques. Each pseudo-range is provided to a processor 165 as shown at 160 and each carrier-phase-based measurement is separately provided to the processor at 162. The processor 165 uses a succession of these values to calculate comparative range changes in each bin traversed by each satellite. The information is accumulated over a suitable period, e.g., 24 hours. Each range change obtained from the code-based measurements is compared with the corresponding carrier-based range change and the results of the comparisons are recorded. In the preferred embodiment of the invention, the comparisons are subtractions of the carrier-based values from the code-based values. However, other forms of comparison can be used, e.g., ratios of the corresponding values. The variations of the comparisons made during the passage of a satellite through a bin are evaluated, for example, by calculating their standard deviation. This figure is then stored in a bin in an array representing the sky map.

The foregoing process continues as successive satellites pass though the respective bins. After a suitable period the standard deviations in each bin are averaged. These averages are measures of the reliabilities of range measurements involving satellites passing through the various bins.

It will be appreciated that the statistical data may be updated periodically, however, it is preferably updated continuously, so that each bin contains a running average of the standard deviations contained in it.

Once the processor 165 has accumulated enough data to place statistically significant values in the sky map 100, the processor can begin evaluating incoming satellite signals according to the directions of the satellites 30. The processor 165 assigns a weight representative of the quality of pseudo-range data available for each satellite and transmits this weight, along with correction data to the GPS receivers 45 over the communication link 50. This approach minimizes the adverse affects of a reference station 20 introducing its own site distortion errors into correction data provided to other receivers. The other GPS receivers 45 using the correction data and corresponding weights can obtain more accurate position solutions from the navigation satellite.

When a satellite 30 enters a portion of the sky associated with low-quality signals, the reference station 20 may stop tracking the satellite 30 altogether, thus freeing channels for different GPS satellites 30 that are better positioned. Other GPS receivers 45 may then disregard the low-quality satellite signals for which no correction data is provided.

While the invention has been described with reference to particular embodiments, it will be understood that the invention is not limited to the particular constructions and methods herein disclosed and/or shown in the drawings, but also comprises any modifications or equivalents within the scope of the claims.

What is claimed is:

1. A receiver for receiving ranging signals from satellites of known positions and calculating measuring ranges therefrom, said receiver comprising:

A. means for calculating quality values for direction bins of a sky map, each bin representing a portion of the sky defined by a range of azimuth values and a range of elevation values, each quality value being based on a parameter indicative of the quality of the ranging signals received from a bin of the sky map;

B. a means for assigning weights to the measurements received from the respective bins in accordance with the corresponding quality values and combining the measurements in accordance with their weights.

2. A reference station at a known location, comprising:

A. the receiver of claim 1;

B. means for comparing the combined measurements with known ranges to provide correction data; and C. a transmitter for transmitting the correction data to one or more other receivers.

3. The receiver of claim 1 in which the quality values correspond to variations in a characteristic of the received ranging signals.

4. The receiver defined in claim 3 wherein the characteristic is the signal-to-noise ratio.

5. The receiver defined in claim 3 in which the characteristic is a code-carrier range comparison.

6. The receiver defined in claim 3 in which the weights assigned to signals received in the respective bins are derived from a moving average of the characteristic over a predetermined interval.

7. The receiver defined in claim 6 wherein the characteristic is the signal-to-noise ratio.

8. The receiver defined in claim 6 in which the characteristic is a code-carrier range comparison.

* * * * *